Nov. 4, 1941.  A. PAHL  2,261,733
LIGHTING APPARATUS
Filed June 22, 1939
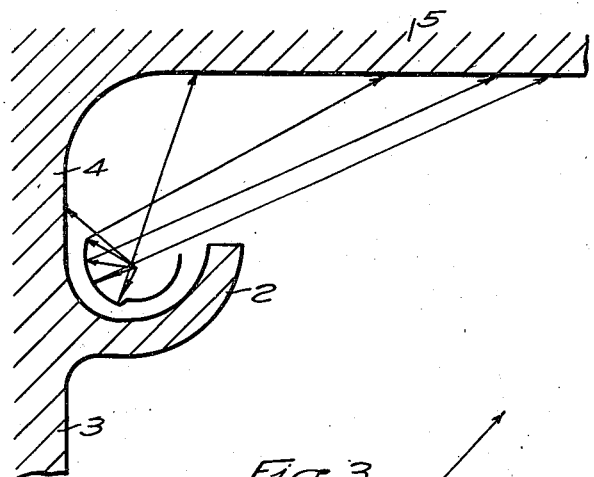
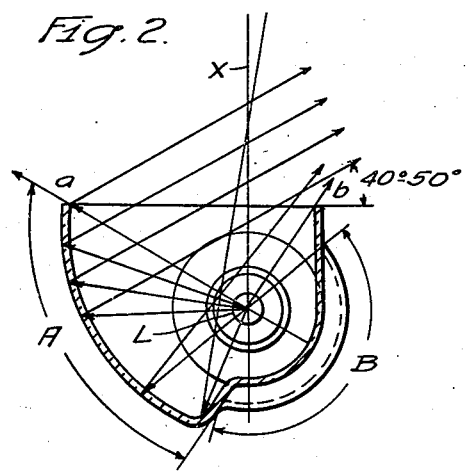
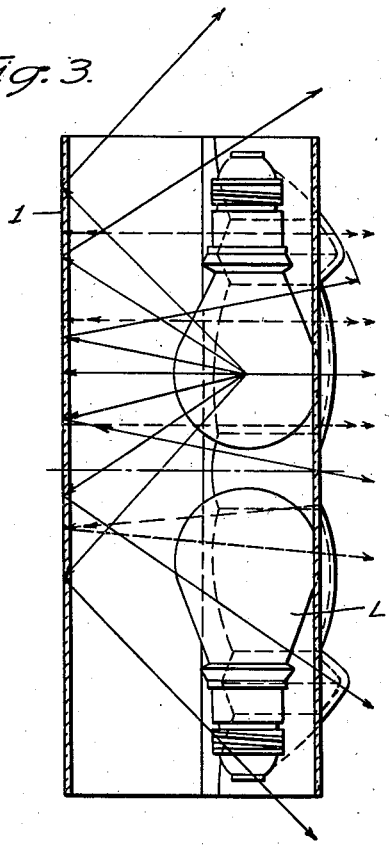
WITNESSES:
INVENTOR
Arno Pahl.
BY
ATTORNEY Patented Nov. 4, 1941

2,261,733

UNITED STATES PATENT OFFICE 2,261,733

LIGHTING APPARATUS

Arno Pahl, Berlin-Siemensstadt, Germany, assignor to Westinghouse Electric & Manufacturing Company, East Pittsburgh, Pa., a corporation of Pennsylvania Application June 22, 1939, Serial No. 280,477
In Germany June 22, 1938

3 Claims. (Cl. 240—103)

My invention relates, generally, to lighting apparatus and more particularly, to mirrors or reflectors suitable for use in the indirect lighting of rooms, front walls of buildings, sign-boards and the like.

In illuminating problems involving the illumination of surfaces of any type of light sources arranged on one side, reflectors are necessary from which the principal portion of the light streams out predominantly on one side. Here the radiation characteristic must be so selected that the largest illuminating intensities impinge on the surfaces removed the greatest distance from the light points. These requirements are imposed, for example, in indirect room illumination from moldings, in the illumination of frame sign-boards, radiation from facade by devices which are arranged on projections extending out only a small distance and a number of others.

From the solution of such illuminating problems, trough-shaped mirror reflectors are known as are also reflectors which consist of somewhat parabolically bent corrugated dispersion glass mirrored on the outside and reflectors in which the zones coming into consideration for the uni-lateral broad radiation are formed parabolically, accordingly radiate the light in a narrow fan after the manner of a searchlight. The latter molding mirrors, which are mostly used, must be arranged close together so as to illuminate the surface on which the radiation falls uniformly in the direction of the luminous spot rows.

The object of my invention, generally stated, is to provide a mirror or reflector for lighting use, which shall be of simple construction, efficient in operation and which may be economically manufactured and installed.

A more specific object of my invention is to provide a mirror or reflector which may be utilized for the indirect illumination of rooms or other objects and which shall function to project or reflect the principal portion of the light from the source in a predetermined direction.

Another object of my invention is to provide a mirror or reflector which may be mounted in a molding adjacent the ceiling of a room to provide indirect room illumination and which shall function to uniformly distribute the light and to project the greatest light intensity on the surfaces at the greatest distance from the light source.

A further object of my invention is to provide a mirror or reflector which functions to produce a uni-lateral broad radiation of light from a light source used therewith.

For a better understanding of the nature and objects of my invention, reference may be had to the drawing, in which:

Figure 1 is a schematic view, showing the use of a mirror or reflector embodying the principal features of my invention;

Fig. 2 is a cross-sectional view of the mirror or reflector of Fig. 1, and

Fig. 3 is a plan view of the mirror or reflector, also showing how the mirror may be used with a plurality of light sources or lamps.

In accordance with the invention, a molding mirror for uni-lateral broad radiation has a zone A circular shaped, parabolic or the like in cross-section and, on the other hand, rectilinear in longitudinal section, and the zone is located opposite to a zone B which is circular shaped in cross-section and parabolic in longitudinal section, the portion of the latter that is nearer to the light emission opening projecting the light emitted from the light source on the first zone, while the portion removed from the light emission opening radiating the light directly.

With reference to Fig. 1, the mirror 1 is, for example, arranged in a molding 2 of the wall 3, so that the light emitted by the reflector impinges on the lateral portion 4 of the wall as well as the ceiling 5.

As shown in Fig. 2, the mirror consists of a side portion or zone A which is so constructed that the light emitted from the source L and reflected, passes through the light emission opening a—b obliquely in such manner that the plane L—X is cut perpendicularly. In this manner, the ceiling 5, as shown in Fig. 1, is illuminated. Because the zone A is constructed rectilinear in longitudinal section, as can be seen from the plan view in Fig. 3, a good broad radiation is attained as can be seen from the indicated rays.

Opposite to the zone A, the side portion or zone B is located, and it is circular in cross-section and, on the other hand, parabolic in longitudinal section. For the purpose of saving space this circular and parabolic zone is off set in a known manner. This zone B reflects with its upper portion, i. e., the portion nearer to the light emission opening a—b, the light emitted by the source L and projects it on the zone A and from there against the ceiling 5, as shown in Fig. 1. By the parabolic horizontal section form, the rays are, however, held together, as can be seen from the dash lines in Fig. 3. Accordingly, an amplification of the light in the direction perpendicular to the longitudinal axis of the mirror is attained. A lower portion of the zone B reflects its light directly against the portion 4 (Fig. 1).

To be able to use in a mirror, a plurality of hot filament lamps, two pieces symmetric with reference to the mirror, are combined so that a plan form results such as illustrated in Fig. 3.

I claim as my invention:

1. A lighting reflector for use in moldings and the like for indirect lighting purposes comprising a first zone of generally curved cross-section and rectilinear in longitudinal section, which is located opposite to and in adjoining relation with a second zone of generally concave shape which is circular in cross-section and parabolic in longitudinal section in part, the portion of the second zone located nearer to the light emission opening projecting the light from the source on to the first zone, and the portion of said second zone most remote from the light emission opening reflecting the light directly, whereby a uni-lateral broad distribution of light is obtained and the reflected light is amplified in a direction perpendicular to the longitudinal axis of the reflector.

2. A reflector for indirect lighting purposes adapted to produce a uni-lateral broad distribution of light comprising, a generally trough-shaped member of light reflecting material open at the ends and having one side portion which is curved in cross-section and rectilinear in longitudinal section and an opposite and adjoining side portion of generally concave shape which is also curved in cross-section and parabolic in longitudinal section in part, the portion of said opposite side portion nearer to the light emission opening of the reflector being disposed to project the light from the source onto the first-mentioned side portion and the portion of said opposite side portion removed from said light emission opening being disposed to reflect the light from the source directly.

3. An indirect lighting reflector for use in wall moldings and the like with a light source to produce a uni-lateral broad radiation over the surface to be lighted comprising, an elongated trough-shaped member of reflecting material open at its ends and having one side portion circular in cross-section and rectilinear in longitudinal section and an opposite and adjoining side portion of generally concave shape circular in cross-section and parabolic in longitudinal section opposite the position of the light source, said opposite and adjoining side portion being offset with respect to the said one side portion, the portion of the said opposite side portion adjacent the light emission opening of the reflector being adapted to project light from the source on to the said first-mentioned portion and the portion of the said opposite portion most remote from the light emission opening being adapted to reflect the light directly.

ARNO PAHL.